(12) United States Patent
Sakurai et al.

(10) Patent No.: US 10,112,446 B2
(45) Date of Patent: *Oct. 30, 2018

(54) RUN-FLAT TIRE

(71) Applicant: BRIDGESTONE CORPORATION, Chuo-ku, Tokyo (JP)

(72) Inventors: Kenichi Sakurai, Tokyo (JP); Osamu Motoori, Tokyo (JP); Gaku Ogawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 220 days.

This patent is subject to a terminal disclaimer.

(21) Appl. No.: 14/897,644

(22) PCT Filed: May 12, 2014

(86) PCT No.: PCT/JP2014/062565
§ 371 (c)(1),
(2) Date: Dec. 11, 2015

(87) PCT Pub. No.: WO2014/199756
PCT Pub. Date: Dec. 18, 2014

(65) Prior Publication Data
US 2016/0144670 A1    May 26, 2016

(30) Foreign Application Priority Data

Jun. 13, 2013  (JP) ................................. 2013-124842

(51) Int. Cl.
*B60C 17/00* (2006.01)
*B60C 15/06* (2006.01)
(Continued)

(52) U.S. Cl.
CPC ............ *B60C 17/0009* (2013.01); *B60C 9/02* (2013.01); *B60C 15/0603* (2013.01);
(Continued)

(58) Field of Classification Search
CPC ............ B60C 17/0009; B60C 17/0018; B60C 17/0036; B60C 17/0045;
(Continued)

(56) References Cited

U.S. PATENT DOCUMENTS 5,494,091 A * 2/1996 Freeman ....................... 152/517
5,988,247 A * 11/1999 Tanaka ................ B60C 17/0009
152/517
(Continued)

FOREIGN PATENT DOCUMENTS

EP    1 022 162 A1 *  7/2000
EP    3 103 659 A1 * 12/2016
(Continued)

OTHER PUBLICATIONS

English machine translation of JP 2006-182294 A, Jul. 13, 2006.*
Office Action issued in corresponding Japanese Patent Application No. 2013-124842 dated Jan. 7, 2014.

*Primary Examiner* — Adrienne C. Johnstone
(74) *Attorney, Agent, or Firm* — Solaris Intellectual Property Group, PLLC

(57) ABSTRACT

A tire includes: bead cores; a carcass; a bead filler that extends along an outer face of the carcass from the bead core toward a tire radial direction outer side; and side reinforcing rubber that is provided at a tire side portion, that extends in the tire radial direction along an inner face of the carcass, that decreases in thickness on progression toward the bead core side and toward a tread portion side, that has an end portion at the bead core side that overlaps with bead filler with the carcass sandwiched therebetween, and that has an elongation at break of 130% or above, wherein a thickness of the side reinforcing rubber at a midpoint between an end portion at the tire radial direction outer side of the bead filler running along the carcass, and the end portion is 40% to 80% of a maximum thickness.

3 Claims, 3 Drawing Sheets

(51) Int. Cl.
*B60C 9/02* (2006.01)
*B60C 17/08* (2006.01)

(52) U.S. Cl.
CPC ........ *B60C 17/08* (2013.01); *B60C 2015/061* (2013.01); *B60C 2017/0054* (2013.01); *B60C 2017/0063* (2013.01); *B60C 2017/0072* (2013.01); *Y10T 152/10837* (2015.01)

(58) Field of Classification Search
CPC .... B60C 2017/0054; B60C 2017/0072; B60C 2001/0033; B60C 17/0027; B60C 17/00; B60C 2017/0063; B60C 15/0603; B60C 2015/061; Y10T 152/10837
USPC .......................................... 152/517, 516, 546
See application file for complete search history.

(56) References Cited

U.S. PATENT DOCUMENTS

| | | | |
|---|---|---|---|
| 6,646,066 B2 * | 11/2003 | Hahn | B60C 17/0009 |
| 2012/0145299 A1 | 6/2012 | Hino et al. | |
| 2012/0267026 A1 * | 10/2012 | Miyazaki | |
| 2015/0166773 A1 * | 6/2015 | Choi | 152/517 |
| 2016/0250900 A1 * | 9/2016 | Ogawa | B60C 17/0009 |
| | | | 152/517 |
| 2016/0263948 A1 * | 9/2016 | Ogawa | B60C 17/0009 |
| 2016/0368328 A1 * | 12/2016 | Sakurai | B60C 17/0009 |
| 2017/0008352 A1 * | 1/2017 | Ogawa | B60C 17/0009 |
| 2017/0036494 A1 * | 2/2017 | Ogawa | B60C 17/00 |
| 2017/0036495 A1 * | 2/2017 | Ogawa | B60C 17/00 |
| 2017/0057300 A1 * | 3/2017 | Sakurai | B60C 17/0009 |
| 2017/0100969 A1 * | 4/2017 | Yokoyama | B60C 17/0009 |

FOREIGN PATENT DOCUMENTS

| | | |
|---|---|---|
| JP | 2006-182294 A | 7/2006 |
| JP | 2012-116212 A | 6/2012 |
| JP | 2012-233152 A | 11/2012 |
| WO | WO-2015/064135 A1 * | 5/2015 |
| WO | WO-2015/064136 A1 * | 5/2015 |
| WO | WO-2015/115162 A1 * | 8/2015 |
| WO | WO-2015/115163 A1 * | 8/2015 |
| WO | WO-2015/122092 A1 * | 8/2015 |
| WO | WO-2015/125387 A1 * | 8/2015 |
| WO | WO-2015/151634 A1 * | 10/2015 |
| WO | WO-2015/159576 A1 * | 10/2015 |
| WO | WO-2015/162969 A1 * | 10/2015 |

* cited by examiner

RUN-FLAT TIRE

TECHNICAL FIELD

The present invention relates to a run-flat tire.

BACKGROUND ART

Side-reinforced type run-flat tires, in which tire side portions are reinforced by side reinforcing rubber, are known as run-flat tires capable of running safely over a specific distance, even in a state in which the internal pressure is reduced due to a puncture, or the like (see, for example, Japanese Patent Application Laid-Open (JP-A) No. 2012-116212).

SUMMARY OF INVENTION

Technical Problem

However, in side-reinforced type run-flat tires, in cases in which lateral force is borne while running flat (while running in the state in which the internal pressure is reduced due to a puncture, or the like), the tire side portion at one side sometimes buckles (a phenomenon in which the tire side portion folds toward the tire inside). There is a concern of damage to the side reinforcing rubber when the tire side portion buckles.

An object of the present invention is to suppress damage to side reinforcing rubber due to a tire side portion buckling in a side-reinforced type run-flat tire.

Solution to Problem

A run-flat tire of a first aspect of the present invention includes: a pair of bead cores; a carcass that straddles between the pair of bead cores and that has end portion sides anchored to the bead cores; a bead filler that extends along an outer face of the carcass from the bead core toward a tire radial direction outer side; and side reinforcing rubber that is provided at a tire side portion, that extends in the tire radial direction along an inner face of the carcass, that decreases in thickness on progression toward a bead core side and toward a tread portion side, that has an end portion at the bead core side that overlaps with bead filler with the carcass sandwiched between the end portion and the bead filler, and that has an elongation at break of 130% or above, wherein a thickness of the side reinforcing rubber at a midpoint between an end portion at the tire radial direction outer side of the bead filler running along the carcass, and the end portion at the bead core side of the side reinforcing rubber, is 40% to 80% of a maximum thickness of the side reinforcing rubber.

Advantageous Effects of Invention

The run-flat tire of the present invention is capable of suppressing damage to the side reinforcing rubber due to the tire side portion buckling.

DESCRIPTION OF EMBODIMENTS

Figure 1:
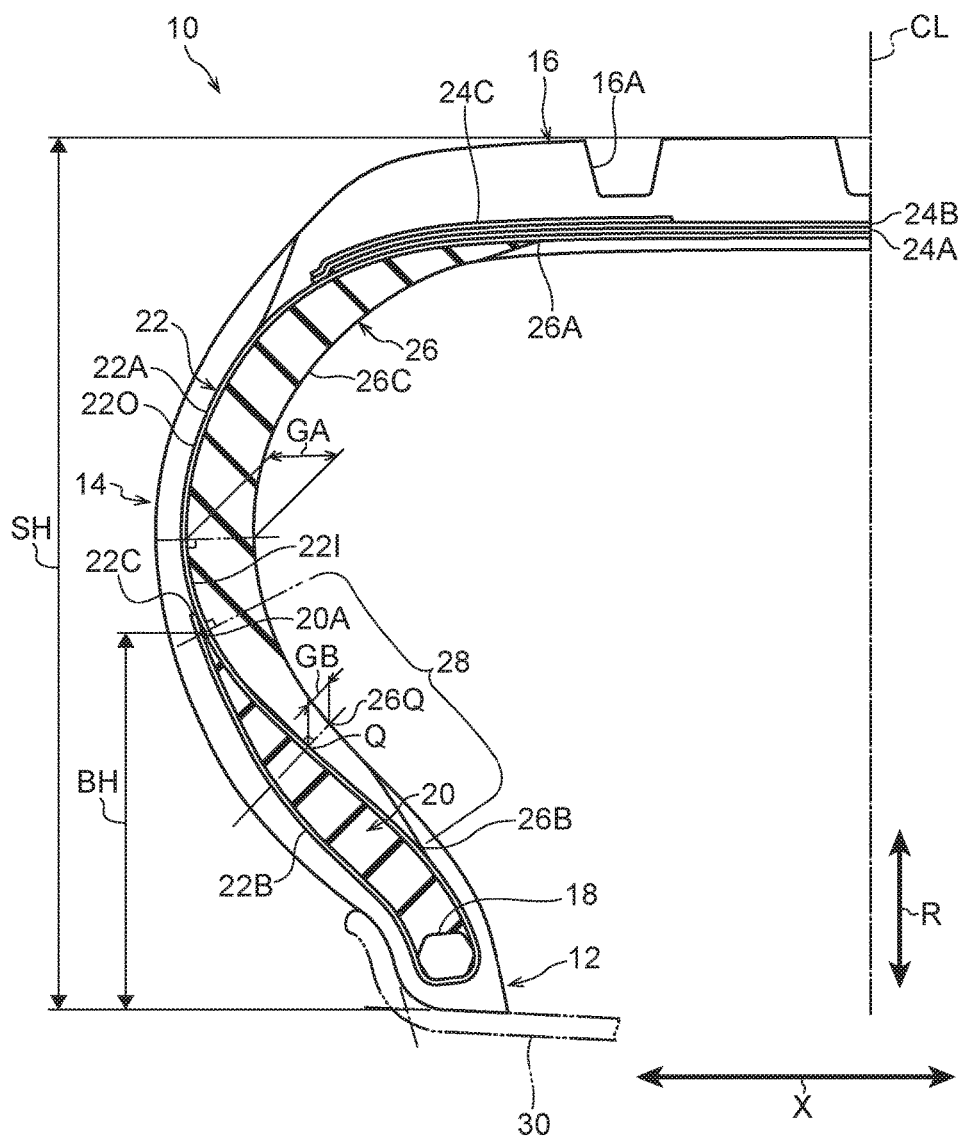
FIG. 1 is a cross-section of a tire half, illustrating one side of a run-flat tire according to an exemplary embodiment of the present invention, sectioned along the tire axial direction.

Explanation follows regarding an exemplary embodiment of the present invention, based on the drawings. FIG. 1 is a cross-section running along the tire axial direction, illustrating one side of a run-flat tire (hereafter simply referred to as "tire") 10 according to the exemplary embodiment of the present invention. Note that in FIG. 1, the arrow X indicates the axial direction of the tire 10 (hereafter referred to as "tire axial direction" as appropriate), the arrow R indicates the radial direction of the tire 10 (hereafter referred to as "tire radial direction" as appropriate), and the reference numeral CL indicates the equatorial plane of the tire 10 (hereafter referred to as "tire equatorial plane" as appropriate). In the present exemplary embodiment, the axial (rotation axis) side of the tire 10 running along the tire radial direction is referred to as "tire radial direction inner side", and the opposite side to the axial side of the tire 10 running along the tire radial direction is referred to as "tire radial direction outer side". The equatorial plane CL side of the tire 10 running along the tire axial direction is referred to as "tire axial direction inside", and the opposite side to the equatorial plane CL side of the tire 10 running along the tire axial direction is referred to as "tire axial direction outside".

The tire 10 illustrated in FIG. 1 is mounted to a standard rim 30 (illustrated by a double-dotted dashed line in FIG. 1), and is filled to a standard air pressure. The standard rim as referred to herein is a rim specified by the Japan Automobile Tire Manufacturer's Association (JATMA) YEAR BOOK 2013. The standard air pressure referred to above is an air pressure corresponding to the maximum load capacity stated in the JATMA YEAR BOOK 2013.

Note that outside Japan, load refers to the maximum load (maximum load capacity) of a single wheel of an applicable size described in the below standards, internal pressure refers to air pressure corresponding to the maximum load (maximum load capacity) of a single wheel described in the below standards, and rim refers to a standard rim (or "approved rim" or "recommended rim") of an applicable size described in the below standards. The standards are determined by the industry standards valid in the region where the tire is manufactured or employed. For example, the standards are specified by the YEAR BOOK of the Tire and Rim Association, Inc. in the United States of America, the STANDARDS MANUAL of the European Tire and Rim Technical Organisation in Europe, and the JATMA YEAR BOOK of the Japan Automobile Tire Manufacturer's Association in Japan.

Note that, although the tire 10 of the present exemplary embodiment is a tire with a aspect ratio of 55% or above, the present invention is not limited to this configuration, and the aspect ratio may be less than 55%.

As illustrated in FIG. 1, the run flat tire 10 according to the present exemplary embodiment includes a pair of bead portions 12 (only the bead portion 12 at the one side is illustrated in FIG. 1), a pair of tire side portions 14 respectively extending from the pair of bead portions 12 toward the tire radial direction outer side, and a tread portion 16 extending from one tire side portion 14 toward the other tire side portion 14. The tire side portions 14 bear load acting on the tire 10 while running flat.

Bead cores 18 are respectively embedded into the pair of bead portions 12. A carcass 22 straddles between the pair of bead cores 18. End portion sides of the carcass 22 are anchored by the bead cores 18. Note that in the carcass 22 of the present exemplary embodiment, each end portion side is folded back about the bead core 18 from the tire inside toward the outside and anchored thereto, and an end portion 22C of a folded-back portion 22B contacts a carcass body portion 22A. The carcass 22 configures a tire frame extending from one bead core 18 toward the other bead core 18 in a toroidal shape.

A belt layer 24A, a cap layer 24B, and a layering layer 24C are respectively installed at the tire radial direction outer side of the carcass body portion 22A. The cap layer 24B covers the entire belt layer 24A, and the layering layer 24C covers the vicinity of end portions of the belt layer 24A. Note that structures of respective members employed in a conventionally known run-flat tire may be employed as the carcass 22, the belt layer 24A, the cap layer 24B and the layering layer 24C.

Each bead portion 12 is embedded with a bead filler 20 extending from the bead core 18 toward the tire radial direction outer side along an outer face 220 of the carcass 22. In the present exemplary embodiment, the bead filler 20 is disposed in a region surrounded by the carcass body portion 22A and the folded-back portion 22B. Note that the outer face 220 of the carcass 22 is a face at the tire outside of the carcass body portion 22A, and a face at the tire inside of the folded-back portion 22B. In the present exemplary embodiment, an end portion 20A at the tire radial direction outer side of the bead filler 20 enters the tire side portion 14. The thickness of the bead filler 20 decreases on progression toward the tire radial direction outer side.

As illustrated in FIG. 1, a height BH of the bead filler 20 is set within a range of 40% to 60% of a tire cross-section height SH. Note that "tire cross-section height" referred to herein refers to a length measured along the tire radial direction, from an intersection point between an extension line of a bead seat and an extension line of a bead base, as far as an end portion furthermost to the tire radial direction outer side of the tire 10, in a state in which the tire 10 is assembled to the standard rim 30, and the internal pressure is set to the standard air pressure. The "height BH of the bead filler" refers to a length measured along the tire radial direction from the above-described intersection point as far as the end portion 20A of the bead filler 20, in the state in which the tire 10 is assembled to the standard rim 30, and the internal pressure is set to the standard air pressure. Note that it is most preferable that the height BH of the bead filler 20 is set within the range of 40% to 60% of the tire cross-section height SH, and that the end portion 20A of the bead filler 20 is further to the tire radial direction inner side than the widest position of the tire 10. "Widest position" referred to herein refers to a position where the width of the tire 10 along the tire axial direction is at its widest.

Side reinforcing rubber 26, which reinforces the tire side portion 14 at the tire axial direction inside of the carcass 22, is installed to each tire side portion 14. The side reinforcing rubber 26 extends along the tire radial direction at an inner face 221 of the carcass 22. The side reinforcing rubber 26 has a shape that decreases in thickness on progression toward the bead core 18 side and toward the tread portion 16 side, such as a substantially crescent shape. Note that "thickness of the side reinforcing rubber" referred to herein refers to a length measured along a line normal to the carcass 22, in the state in which the tire 10 is assembled to the standard rim 30, and the internal pressure is set to the standard air pressure.

An end portion 26A at the tread portion 16 side of the side reinforcing rubber 26 overlaps the tread portion 16 with the carcass 22 (carcass body portion 22A) sandwiched therebetween, and an end portion 26B at the bead core 18 side of the side reinforcing rubber 26 overlaps the bead filler 20 with the carcass 22 sandwiched therebetween. The side reinforcing rubber 26 is formed of harder rubber than another rubber that configures the tire side portions 14, and is reinforcing rubber that allows a specific distance to be ran in a state in which the weight of the vehicle and its occupants are supported, in cases in which the internal pressure of the tire 10 has decreased due to a puncture, or the like.

The elongation at break of the side reinforcing rubber 26 is set within a range of from 130% to 190%. Note that "elongation at break" referred to herein indicates elongation at break (%) specified based on JIS K6251 (employing dumbbell-shaped No. 3 test samples). Although the side reinforcing rubber 26 of the present exemplary embodiment is configured of a single type of rubber, the present invention is not limited to this configuration, and may be configured of plural types of rubber.

As illustrated in FIG. 1, a thickness GB of the side reinforcing rubber 26 at a midpoint Q, between the end portion 20A of the bead filler 20 running along the extension direction of the carcass 22, and the end portion 26B of the side reinforcing rubber 26, is set within a range of 40% to 80% of a maximum thickness GA of the side reinforcing rubber 26.

The tread portion 16 is formed with plural circumferential direction grooves 16A extending along the tire circumferential direction. An inner liner, not illustrated in the drawings, is installed from the one bead portion 12 across to the other bead portion 12 at an inner face of the tire 10.

Although the hardness of the bead filler 20 is the same or higher than the hardness of the side reinforcing rubber 26 in the present exemplary embodiment, the present invention is not limited to this configuration.

Explanation follows regarding effects of the tire 10 of the present exemplary embodiment.

Figure 2:
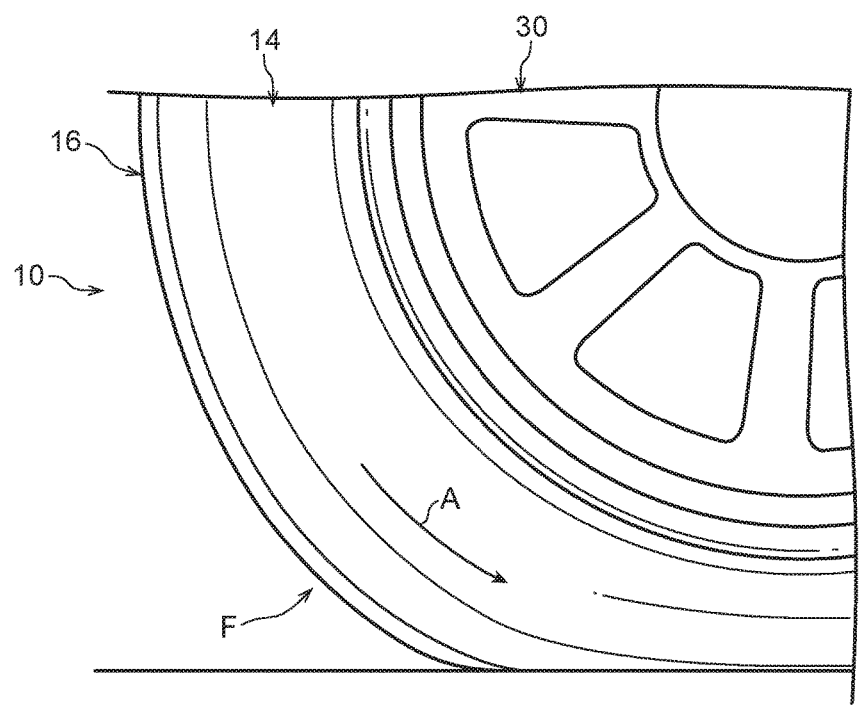
FIG. 2 is a tire side view, illustrating the run-flat tire illustrated in FIG. 1 in a running state, viewed from the tire axial direction.
Figure 3:
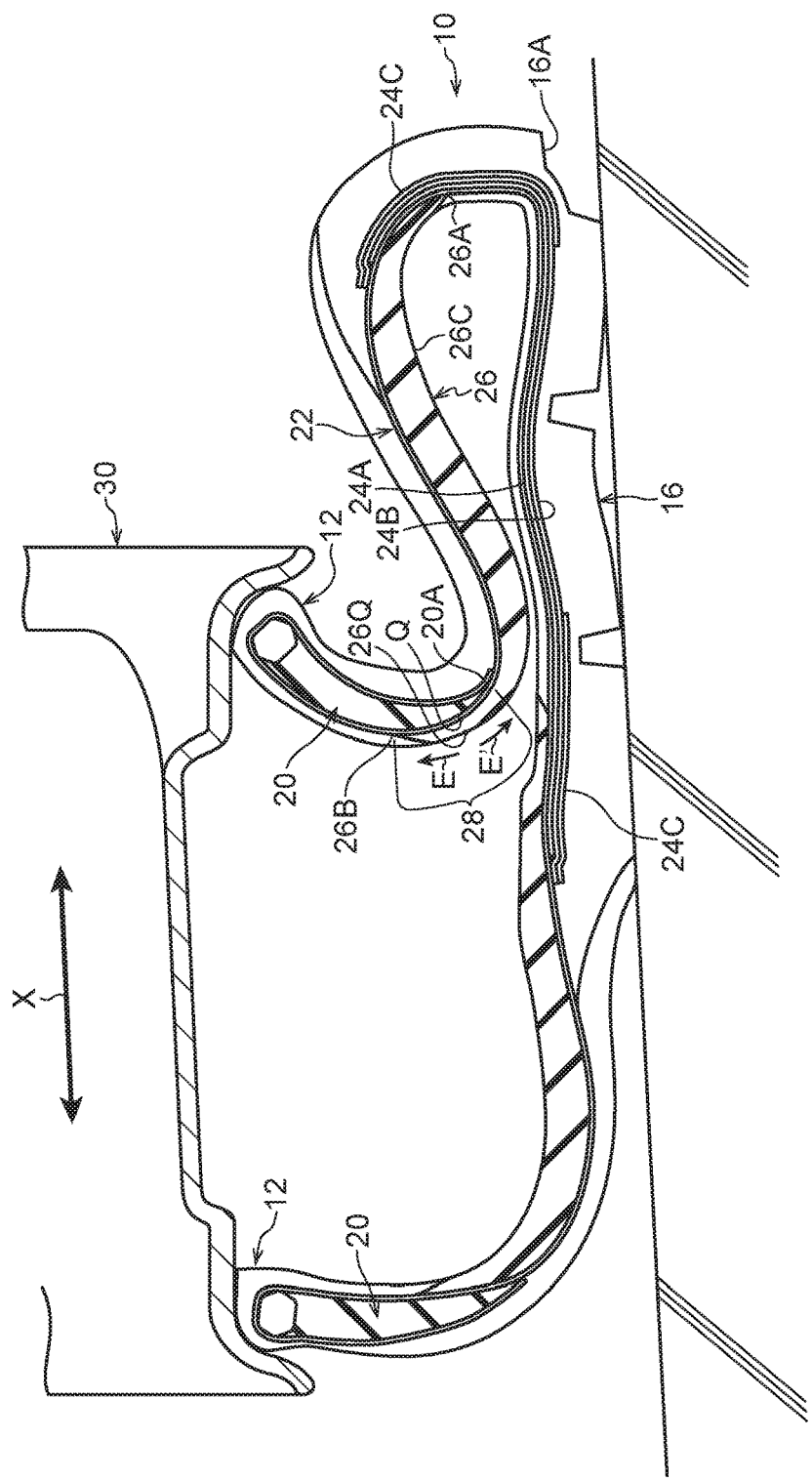
FIG. 3 is a tire cross-section illustrating the run-flat tire illustrated in FIG. 1 in a state in which a tire side portion has buckled, sectioned along the tire axial direction.

As illustrated in FIG. 2, while running flat, the front and rear of a ground-contact section of the tire 10 (particularly a tread-in side portion F) are in a state that is largely flexed under load (note that the arrow A direction in FIG. 2 is the tire rotation direction). As illustrated in FIG. 3, when the tire 10 bears an excessive lateral force due to cornering in this state, for example, the tire side portion 14 at the one side buckles (a phenomenon in which the tire side portion 14 folds toward the tire inside). In cases in which the tire side portion 14 buckles in this manner, an inner face 26C of the side reinforcing rubber 26 is stretched and deformed (extends). This deformation by stretching (tensile deformation) is liable to increase at an overlap portion 28 of the side reinforcing rubber 26, which overlaps the bead filler 20 with the carcass 22 sandwiched therebetween. However, since the elongation at break of the side reinforcing rubber 26 is 130% or above, damage (breaking or cracks) to the side reinforcing rubber 26 can be suppressed compared to a configuration in which the elongation at break of side reinforcing rubber is 130% or below, for example. The side reinforcing rubber 26 accordingly has improved durability, and improved run-flat durability.

However, if the elongation at break of the side reinforcing rubber 26 was increased excessively, the hardness of the side reinforcing rubber 26 would decrease, such that the thickness of the side reinforcing rubber 26 would need to be increased in order to secure the run-flat durability. However, in the tire 10, the elongation at break of the side reinforcing rubber 26 is set at 190% or below, such that there is no need to make the side reinforcing rubber 26 excessively thick in order to secure the run-flat durability (durability while running flat), thereby enabling an excessive increase in weight to be suppressed. This enables the rolling resistance of the tire 10 while running to be reduced, and enables the fuel efficiency of a vehicle mounted with the tire 10 to be improved.

In the tire 10, the end portion 26B of the side reinforcing rubber 26 overlaps the bead filler 20 with the carcass 22 sandwiched therebetween, thereby increasing the rigidity of the tire side portion 14 and improving the run-flat durability.

In the tire 10, the height BH of the bead filler 20 is set at 40% to 60% of the tire cross-section height SH, thereby enabling detachment from the rim to be effectively suppressed while running flat. Specifically, in cases in which the height BH of the bead filler 20 is less than 40% of the tire cross-section height SH, the bead portion 12 has a lower rigidity and is more liable to deform, such that detachment from the rim is more liable to occur when bearing lateral force while running flat. In cases in which the height BH is more than 60% of the height SH, the bead portion 12 has a higher rigidity and is less liable to deform, such that the bead portion 12 is more liable to detach from the rim when the tire side portion 14 has buckled when bearing lateral force while running flat (see FIG. 3). It is therefore preferable that the height BH of the bead filler 20 is set within a range of 40% to 60% of the tire cross-section height SH.

Moreover, when the end portion 20A of the bead filler 20 is further to the tire radial direction outer side than the widest position of the tire 10, the tire side portion 14 has a higher rigidity and is less liable to deform, such that the bead portion 12 is more liable to detach from the rim when the tire side portion 14 has buckled when bearing lateral force while running flat (see FIG. 3). It is therefore preferable that the end portion 20A of the bead filler 20 is positioned further to the tire radial direction inner side than the widest position of the tire 10.

In the tire 10, the thickness of the side reinforcing rubber 26 decreases on progression toward the bead core 18 side and toward the tread portion 16 side, and the thickness GB of the side reinforcing rubber 26 at the midpoint Q of the overlap portion 28 is set at 40% to 80% of the maximum thickness GA. There is accordingly a shorter distance from the carcass 22 to the inner face 26C of the side reinforcing rubber 26 at the midpoint Q of the overlap portion 28, where deformation due to stretching of the side reinforcing rubber 26 increases. Thus, there is reduced tensile stress acting on the inner face 26C of the side reinforcing rubber 26 (specifically, a portion of the inner face 26C corresponding to the overlap portion 28) when the tire side portion 14 has buckled. Damage to the side reinforcing rubber 26 is accordingly further suppressed. Note that, when the tire side portion 14 has buckled, the side reinforcing rubber 26 folds toward the tire inside about a point 26Q of the inner face 26C corresponding to the midpoint Q (the intersection point between the normal line passing through the midpoint Q (the line normal to the carcass 22) and the inner face 26C), such that stretching occurs in the arrow E and E directions in the vicinity of the point 26Q (see FIG. 3). In cases in which the thickness GB is less than 40% of the maximum thickness GA, the thickness of the side reinforcing rubber 26 in the vicinity of the midpoint Q is excessively thin, and the rigidity of the tire side portion 14 is reduced, such that there is a concern that the run-flat durability is reduced. In cases in which the thickness GB is more than 80% of the maximum thickness GA, the thickness of the side reinforcing rubber 26 in the vicinity of the midpoint Q is excessively thick, and tensile stress acting on the inner face 26C when the tire side portion 14 has buckled cannot be sufficiently reduced. It is therefore preferable that the thickness GB is set within a range of 40% to 80% of the maximum thickness GA.

In tires in which the height of each tire side portion 14 (the length along the tire radial direction) is high, such as tires with a aspect ratio of 55% or above, as in the tire 10 of the present exemplary embodiment, the tire side portion 14 is more liable to buckle. Thus by setting the elongation at break of the side reinforcing rubber 26 within a range of 130% to 190%, damage to the side reinforcing rubber 26 due to the tire side portion 14 buckling can be effectively suppressed.

In the exemplary embodiment described above, each end portion side of the carcass 22 is folded back from the tire axial direction inside toward the outside about the bead core 18, and the end portion of the carcass 22 is configured anchored to the bead core 18. However, the present invention is not limited to this configuration. For example, a configuration may be applied in which the bead core 18 is divided in half, and an end portion side of the carcass 22 is sandwiched between the divided bead core 18, thereby anchoring the end portion of the carcass 22 to the bead core 18.

As illustrated in FIG. 1, in the exemplary embodiment described above, the side reinforcing rubber 26 is configured by one type of rubber; however the present invention is not limited to this configuration, and the side reinforcing rubber 26 may be configured by plural types of rubber. For example, the side reinforcing rubber 26 may be configured by overlapping plural different types of rubber along the tire radial direction, or the side reinforcing rubber 26 may be configured by overlapping plural different types of rubber along the tire axial direction. Note that in cases in which the side reinforcing rubber 26 is configured by overlapping plural different types of rubber along the tire radial direction, the advantageous effects of the present invention can be obtained by setting the elongation at break of a portion of the side reinforcing rubber 26 including the midpoint Q within a range from 130% to 190%. In cases in which the side reinforcing rubber 26 is configured by overlapping plural different types of rubber along the tire axial direction, the advantageous effects of the present invention can be obtained by setting the elongation at break of the rubber forming the inner face 26C of the side reinforcing rubber 26 (the rubber out of the plural types of rubber configuring the side reinforcing rubber 26 that is furthest to the tire axial direction inside) within a range from 130% to 190%.

An exemplary embodiment of the present invention has been explained above; however, the present invention is not limited to this exemplary embodiment, and obviously various embodiments may be implemented within a range not departing from the spirit of the present invention.

TEST EXAMPLES

In order to verify the advantageous effects of the present invention, ten types of run-flat tires (hereafter simply referred to as tires) including the present invention (examples 1 to 10 below), and one type of run-flat tire of a Comparative Example that does not include the present invention (Comparative Example 1 below) were prepared, and tests 1 and 2 below were performed.

First, explanation following regarding the run-flat tires of the examples 1 to 5, and the run-flat tire of the Comparative Example 1 employed in test 1. Note that the size of each run-flat tire employed in the test was 195/65R15. The run-flat tires of the examples 1 to 5 each adopted the same structure as the structure of the tire 10 of the above-described exemplary embodiment, and are tires that each had a different value for "elongation at break of side reinforcing rubber", "maximum thickness GA of side reinforcing rubber", and "height BH of bead filler". The run-flat tire of the Comparative Example 1 was a tire that had the same structure as the run-flat tires of the examples 1 to 5; however, the value for elongation at break of the side reinforcing rubber is not included in the present invention. The respective values of the examples 1 to 5 and the Comparative Example 1 are shown in table 1. Note that, with respect to the maximum thickness GA of the side reinforcing rubber of the examples 1 to 5, the thickness required to obtain the same run-flat durability as the Comparative Example 1 is shown as indices, with the maximum thickness GA of the Comparative Example 1 as a reference value (100). Note that the lower the value of the maximum thickness GA indicated, the better the result.

In the test 1, first, each test tire was assembled to a standard rim according to the JATMA standard, mounted to a vehicle without being filled with air (internal pressure was set at 0 kPa), and broken-in by running over a distance of 5 km at a speed of 20 km/h. The vehicle then entered a circuit track with radius of curvature of 25 m at a specific speed, and stopping was performed two consecutive times at a position at one third of a cycle of the circuit track (J-turn test). In cases in which there was no damage to an inner face of the side reinforcing rubber, the speed was raised by 2 km/h and testing was performed again. The J-turn test was performed until damage occurred to the inner face of the side reinforcing rubber. Note that the entry speed when damage occurred to the inner face of the respective side reinforcing rubber of the examples 1 to 5 is shown and evaluated by indices, with the entry speed when damage occurred to the inner face of the side reinforcing rubber of the Comparative Example 1 as a reference value (100). Note that the "cracking resistance" in table 1 is the entry speed when damage occurred to the inner face of the side reinforcing rubber shown as indices. The larger the value of the cracking resistance, the better the result.

The above J-turn test was also performed while raising the entry speed by 2 km/h, and the entry speed was measured when the bead portion detached from the rim (the hump of the rim). Note that the entry speed when the respective bead portion of the examples 1 to 5 detached from the rim is shown and evaluated as indices, with the entry speed when the bead portion of the Comparative Example 1 detached from the rim as a reference value (100). Note that the "rim detachment properties" in table 1 is the entry speed when the bead portion detached from the rim shown as indices. The larger the value of the rim detachment properties, the better the result.

Next, each test tire was assembled to a standard rim according to JATMA standards, mounted to a vehicle and ran at a specific speed in a state imparted with a specific internal pressure (an internal pressure specified by JATMA), and the ride quality was evaluated according to how an occupant felt. Note that the ride quality is shown as indices in the examples 1 to 5, with the Comparative Example 1 as the reference value (100). The larger the value of the ride quality, the better the result.

TABLE 1

| | Comparative Example 1 | Example 1 | Example 2 | Example 3 | Example 4 | Example 5 |
|---|---|---|---|---|---|---|
| Elongation at break of side reinforcing rubber (%) | 125 | 170 | 190 | 200 | 170 | 170 |
| Height BH of bead filler (%) | 43 | 51 | 51 | 51 | 55 | 47 |
| Cracking resistance | 100 | 132 | 142 | 147 | 137 | 126 |
| Rim detachment properties | 100 | 107 | 107 | 107 | 104 | 102 |
| Maximum thickness GA of side reinforcing rubber | 100 | 102 | 105 | 108 | 99 | 105 |
| Ride quality | 100 | 98 | 93 | 91 | 95 | 100 |

In the examples 1 to 5, the elongation at break of the side reinforcing rubber was set at 130% or above, such that the cracking resistance of the side reinforcing rubber were improved. When the elongation at break of the side reinforcing rubber exceeded 190%, the maximum thickness GA of the side reinforcing rubber was excessively thick in order to secure run-flat durability, such that the weight increased, and there was a tendency that ride quality was negatively affected.

Explanation follows regarding run-flat tires of examples 6 to 10, employed in test 2. Note that the size of each of the run-flat tires employed in test 2 was 195/65615. The run-flat tires of the examples 6 to 10 each adopted the same structure as the structure of the tire 10 of the above-described present exemplary embodiment, and were tires that each had a different value for "maximum thickness GA of side reinforcing rubber", "thickness GB at midpoint Q of side reinforcing rubber (mm)", and "proportion of thickness GB with respect to maximum thickness GA". The respective values of the examples 6 to 10 are shown in table 2. Note that the elongation at break of the side reinforcing rubber of each of the examples 6 to 10 was set at 170%.

In test 2, each test tire was assembled to a standard rim according to JATMA standards, attached to a drum test machine without being filled with air (the internal pressure was set at 0 kPa). The distance run (distance run on the rotating drum) until the tire side portion of each test tire failed was then measured, while running flat (straight running flat) at a specific speed (rotation speed), in a state pressed by the rotating drum at a radial load of 400 kgf. The respective distances run until the tire side portion of the examples 6 to 10 failed is shown and evaluated as indices, with the distance run until the tire side portion of the Comparative Example 1 failed as a reference value (100). Note that the "run-flat durability" in table 2 shows the distance run until the tire side portion failed as indices. The larger the value of the run-flat durability, the better the result. The cracking resistance of the examples 6 to 10 were evaluated by a similar method to test 1.

TABLE 2

|  | Example 6 | Example 7 | Example 8 | Example 9 | Example 10 |
|---|---|---|---|---|---|
| Maximum thickness GA of side reinforcing rubber (mm) | 9 | 9 | 9 | 10 | 10 |
| Thickness GB at midpoint Q of side reinforcing rubber (mm) | 6 | 4 | 3.5 | 6 | 3.5 |
| Proportion (%) | 67 | 44 | 39 | 60 | 35 |
| Cracking resistance | 121 | 128 | 132 | 121 | 132 |
| Run-flat durability (km) | 150 | 105 | 75 | 240 | 90 |

As illustrated in table 2, in the examples 6, 7, and 9, since the thickness GB at the midpoint Q of the side reinforcing rubber was within a range of 40% to 80% of the maximum thickness GA, favorable cracking resistance were obtained, and favorable run-flat durability was also obtained. However, in the examples 8 and 10, it can be seen that, since the thickness GB at the midpoint Q of the side reinforcing rubber was less than 40% of the maximum thickness GA, the run-flat durability was reduced.

Note that the disclosure of Japanese Patent Application No. 2013-124842, filed on Jun. 13, 2013, is incorporated in its entirety by reference herein.

The invention claimed is:

1. A run-flat tire comprising:
a pair of bead cores;
a carcass that straddles between the pair of bead cores and that has end portion sides anchored to the bead cores;
a bead filler that extends along an outer face of the carcass from the bead core toward a tire radial direction outer side; and
run-flat side reinforcing rubber that is provided at a tire side portion, that extends in the tire radial direction along an inner face of the carcass, that decreases in thickness on progression toward a bead core side and toward a tread portion side, that has an end portion at the bead core side that overlaps with the bead filler with the carcass sandwiched between the end portion and the bead filler, and that has an elongation at break of 130% or above, wherein a thickness of the run-flat side reinforcing rubber at a midpoint between an end portion at the tire radial direction outer side of the bead filler running along the carcass, and the end portion at the bead core side of the run-flat side reinforcing rubber, is 40% to 80% of a maximum thickness of the run-flat side reinforcing rubber, wherein the run-flat tire has an aspect ratio of 55% or above, and wherein the radially outer end portion of the bead filler is further to the tire radial direction outer side than the widest position of the tire.

2. The run-flat tire of claim 1, wherein the elongation at break of the run-flat side reinforcing rubber is 190% or below.

3. The run-flat tire of claim 1, wherein a height of the bead filler is 40% to 60% of a tire cross-section height.

* * * * *